(12) United States Patent
Kellens et al.

(10) Patent No.: US 11,612,180 B2
(45) Date of Patent: Mar. 28, 2023

(54) VERSATILE SEMI-CONTINUOUS DEODORIZER WITH COMBINED EXTERNAL STRIPPING AND SCRUBBING COLUMN

(71) Applicant: DESMET BELGIUM, Zaventem (BE)

(72) Inventors: Marc Kellens, Mechelen-Muizen (BE); Alan Paine, Dartford (GB)

(73) Assignee: Desmet Belgium, Zaventem (BE)

( * ) Notice: Subject to any disclaimer, the term of this patent is extended or adjusted under 35 U.S.C. 154(b) by 200 days.

(21) Appl. No.: 16/801,849

(22) Filed: Feb. 26, 2020

(65) Prior Publication Data
US 2020/0297008 A1    Sep. 24, 2020

Related U.S. Application Data

(60) Provisional application No. 62/821,033, filed on Mar. 20, 2019.

(51) Int. Cl.

| | |
|---|---|
| *A23L 5/20* | (2016.01) |
| *B01D 3/14* | (2006.01) |
| *A23D 9/04* | (2006.01) |
| *B01D 53/18* | (2006.01) |
| *B01D 3/00* | (2006.01) |
| *B01D 3/38* | (2006.01) |
| *B01D 5/00* | (2006.01) |

(52) U.S. Cl.
CPC ............. *A23L 5/276* (2016.08); *A23D 9/04* (2013.01); *A23L 5/23* (2016.08); *B01D 3/007* (2013.01); *B01D 3/143* (2013.01); *B01D 3/38* (2013.01); *B01D 5/003* (2013.01); *B01D 53/18* (2013.01); *A23V 2002/00* (2013.01)

(58) Field of Classification Search
USPC ............. 261/97; 202/186, 205, 236; 95/159; 96/234, 290; 554/175, 205; 426/607
See application file for complete search history.

(56) References Cited

U.S. PATENT DOCUMENTS

| | | | | |
|---|---|---|---|---|
| 3,933,953 A | * | 1/1976 | Leva | C07C 51/44 96/199 |
| 3,999,966 A | * | 12/1976 | Naylor | C11B 3/14 96/201 |
| 4,036,865 A | * | 7/1977 | Hartmann | C11B 3/14 203/79 |

(Continued)

FOREIGN PATENT DOCUMENTS

| | | |
|---|---|---|
| EP | 1505145 A1 | 2/2005 |
| EP | 1905816 A1 | 4/2008 |

(Continued)

OTHER PUBLICATIONS

Examination Notice for corresponding Hong Kong Patent Application No. 22020004310.1, dated Aug. 8, 2022, 4 pages.

(Continued)

*Primary Examiner* — Jonathan Miller
(74) *Attorney, Agent, or Firm* — McDonald Hopkins LLC (57) ABSTRACT

A semi-continuous deodorizer providing a first main vessel, and a second vessel, wherein the second vessel is connected to the first main vessel by a duct for the transport of gases and vapors, the second vessel being connected to a vacuum system, wherein both the first main vessel and the second vessel are made of stainless steel and built hermetically.

20 Claims, 4 Drawing Sheets

(56) References Cited

U.S. PATENT DOCUMENTS

| | | | | |
|---|---|---|---|---|
| 4,804,555 | A * | 2/1989 | Marschner | A23C 15/145 426/492 |
| 4,838,997 | A * | 6/1989 | Merk | B01D 5/0036 202/205 |
| 4,971,660 | A * | 11/1990 | Rivers, Jr. | B01D 3/10 203/40 |
| 4,996,072 | A * | 2/1991 | Marschner | A23D 9/00 426/492 |
| 5,091,116 | A * | 2/1992 | Krishnamurthy | C11B 3/001 554/194 |
| 5,315,020 | A * | 5/1994 | Cheng | C11B 3/14 554/205 |
| 5,437,714 | A * | 8/1995 | Cook | C11B 3/14 96/201 |
| 6,001,220 | A * | 12/1999 | Hillstrom | C11B 3/14 202/205 |
| 6,172,248 | B1 * | 1/2001 | Copeland | C07F 9/103 554/204 |
| 6,672,572 | B2 * | 1/2004 | Werlen | F25J 3/04909 261/112.2 |
| 6,750,359 | B1 * | 6/2004 | Copeland | C11B 13/00 554/205 |
| 7,597,783 | B2 * | 10/2009 | Kruidenberg | B01D 5/003 202/205 |
| 7,670,634 | B2 | 3/2010 | Kellens et al. | |
| 7,892,335 | B2 * | 2/2011 | Kellens | C11C 1/106 261/96 |
| 9,114,329 | B2 * | 8/2015 | Galina | C11B 3/14 |
| 2002/0169333 | A1 * | 11/2002 | Kellens | B01D 1/305 554/205 |
| 2004/0030166 | A1 * | 2/2004 | Copeland | C07J 53/00 552/545 |
| 2005/0066823 | A1 * | 3/2005 | Kellens | B01D 3/346 99/472 |
| 2008/0081097 | A1 | 4/2008 | Kellens et al. | |
| 2013/0084375 | A1 * | 4/2013 | Gabor | C11B 3/14 426/417 |
| 2013/0287925 | A1 * | 10/2013 | Schols | A23D 9/04 426/601 |

FOREIGN PATENT DOCUMENTS

| | | |
|---|---|---|
| GB | 2283435 A | 5/1995 |
| GB | 2283688 A | 5/1995 |
| WO | WO2011/019315 A2 | 2/2011 |

OTHER PUBLICATIONS

Examination report dated Mar. 30, 2022, in corresponding GB Pat. App. No. GB2003770.1 (3 pages).

Search report dated Aug. 24, 2020, in corresponding GB Pat. App. No. GB2003770.1 (4 pages).

* cited by examiner

VERSATILE SEMI-CONTINUOUS DEODORIZER WITH COMBINED EXTERNAL STRIPPING AND SCRUBBING COLUMN

CROSS-REFERENCE TO RELATED APPLICATION

This application claims the priority benefit of Application Ser. No. 62/821,033 filed Mar. 20, 2019, the entirety of which is herein incorporated by reference.

FIELD OF THE INVENTION

The present technology relates to the removal of free fatty acids and malodorous compounds from edible oils and fats, and more particularly, to a deodorizer with a combined external stripping and scrubbing vessel advantageous for the semi-continuous deodorizing of oils and fats allowing rapid stock changes with minimal downtime, minimal cross-contamination, and minimal product loss.

BACKGROUND OF THE INVENTION

Generally, the final refining step of most edible oils and fats involves a deodorizer where contaminants are steam stripped and/or thermally decomposed. This is achieved by contacting the oil with steam at high temperature under high vacuum. During the deodorization, free fatty acids (FFA) are also steam stripped. The removal of FFA during the deodorization is known in the art as physical refining. Physical refining can advantageously replace chemical refining since chemical refining, aside from consuming chemicals and generating problematic wastes, induces oil losses proportional to the amount of FFA removed. Nevertheless, a substantial share of edible oils is still chemically refined (most notably crude soybean oil), which is the most consumed edible oil in the US. This is due to the fact that crude soybean oil is an oil naturally containing a low quantity of FFA (usually less than 1.0%), and also due to the fact that chemically refined oils may still have superior organoleptic properties over physically refined oil. However, in some regions, soybean oil will be preferably physically refined.

However, even a chemically refined oil still needs to be deodorized in order to remove any malodourous components, unpleasant taste, and/or color in order to obtain a marketable edible oil of extended shelf-life, meeting all trade specifications and food safety regulations.

Therefore, there is a need for deodorizers that are able to economically process a large spectrum of oils that may contain nearly no FFA (since they have been previously chemically refined), low to medium amount of FFA (such as soybean oil that has not been chemically refined), or finally, oil that contains large amounts of FFA (such as, for example, palm oil), that may contain about 5% of FFA. Semi-continuous deodorizers are commonly used when it is necessary to switch frequently between one type of product and another.

Ideally, a semi-continuous deodorizer should be versatile but still economical. Deodorization works by contacting the oil with steam at high temperature under high vacuum for a defined period of time. Since some malodorous compounds are thermally decomposed at a relatively slow speed, the oil must be maintained for a sufficient time at high temperature under high vacuum and contacted with stripping steam to remove or take away the breakdown products. This step typically takes place in several trays equipped with steam diffusors that can be, for example, mammoth pumps or circular tubes (known in the field as "crowns") or simple sparge pipes.

During the deodorization, some FFA will be stripped as well and for oil containing low quantity of FFA, (typically soybean oil containing less than 1% of FFA or for chemically refined oil containing even less that 0.1% of FFA) a very low level of remaining FFA can be already attained after the time needed for the deodorization per se so that a marketable edible oil having an extended shelf-life is obtained. However, for oils containing medium to high concentrations of FFA, such trays equipped with mammoth pumps or crowns will require a longer residence time in the tray(s) and a substantially larger quantity of stripping steam to complete the FFA removal.

Aside from excessive steam consumption, long deodorization time can be detrimental to oil quality. For example, removing free fatty acids from rapeseed oil containing about 2% of FFA is not easy in a semi-continuous deodorizer because the oil must be kept in the deodorizing trays for so long that excessive amounts of trans isomers of fatty acids may form.

Therefore, in order to solve those issues, some deodorizers include a packed stripper of high surface area where the oil forms a thin film and at the same time trickles down, while simultaneously counter-currently contacting the rising steam. Such a packed stripper assures a very intimate contact between oil and steam, and is thus very efficient at stripping the FFA, (i.e. the stripping of the FFA is realized much more rapidly and with far less stripping steam than in classical deodorizing trays equipped with mammoth pumps or crowns or sparge pipes). However, a packed stripper is not sufficient for the deodorization stricto sensus, and therefore, at least one deodorizing tray is still included in any deodorizer. A packed stripper can remove the FFA and at least a part of the smell of an oil, but this removal action is done so quickly that the heat treatment of the oil that leads to a colorless and stable product, is not completed at all.

One characteristic of a packed stripper is that it induces a pressure drop because it presents a restriction to the flow of the rising stripping steam, and therefore slightly more stripping steam must be used in the deodorization trays situated below said packing. However, for oils having a medium to high FFA concentration, a packed stripper is so efficient to remove the FFA that globally, it will significantly reduce the stripping steam consumption.

As such, when a packed stripper is mounted above deodorizing trays, nearly all the FFA is removed in the pack before the oil enters the trays. On the other hand, if a deodorizer equipped with a packed stripper must process an oil containing low amount of FFA, slightly more stripping steam may be used (depending on the design and material composing the packed stripper), because of the pressure drop generated by said packed stripper. Such packed stripper will have virtually no effect on the deodorization since the oil stays only a short time in said packed stripper. Therefore, in the particular case of oils containing a low concentration of FFA, a packed stripper may be redundant or even induce a slight increase of stripping steam consumption in particular if the design and the material used for the packed stripper results in a large pressure drop. Nevertheless, in the context of a semi-continuous deodorizer designed to process various stocks of oils of various origins and containing various amounts of FFA, the experience shows that generally, a packed stripper is advantageous to reduce the overall stripping steam consumption.

However, a main drawback of a packed stripper is a rather large oil/oil cross-contamination in case of stock changes. Indeed, oil has a marked affinity for metal and therefore, since a packed stripper has a large surface area (typically 250 m$^2$/m$^3$) it takes time for a new stock of oil to completely wash the previous stock. This leads to oil/oil cross-contamination for each stock change and thus to an oil loss or at least to the production of a lower-grade oil.

Therefore, one solution would be to bypass such packed stripper when processing oil containing a medium amount of FFA or chemically refined oil containing only a small amount of residual FFA, but that oil still needs to be carefully deodorized to remove unpleasant taste, odors and colors that are not removed by the chemical refining. Typically, a deodorizer is made of a main upright vessel maintained under high vacuum where oil is introduced to the top and trickles down to the vessel's bottom while being contacted macroscopically in a counter-flow manner with steam which is introduced at the bottom of the deodorizing tray(s) and packed stripper. To be accurate, in an individual deodorizing tray, the steam is not truly contacted counter-currently with the oil but rather in a cross-flow mode. The oil is first heated at target temperature, using as much as possible energy recovery that is known in the field, then the oil is directed and regularly distributed to trickle down through the packed stripper, recovered in a collector tray and then directed in at least one deodorizing tray where it will be deodorized by mean of mammoth pumps for example. Finally, the oil will be cooled before leaving the deodorizer. The vapor outlet connected to the vacuum must be located above the packed stripper since it is understood that the stripping steam rises from bottom to top to act as a stripping agent for the oil trickling down said packed stripper.

U.S. Pat. No. 9,114,329 B2 to Galina discloses a semi-continuous deodorizer where the disclosed configuration is compact and provides a reduced plant footprint, where heat loss is also reduced to a minimum. However, this configuration has the drawback that when the packed stripper (called structured packing in U.S. Pat. No. 9,114,329 B2) is redundant (i.e. when processing low FFA or chemically refined oil), the main vessel will be maintained at high temperature and hence, the oil sticking to its surface will thermally degrade if oil is not constantly trickling down on its surface. Therefore, with such design, the packed stripper cannot be safely bypassed because it would run dry while still being at a high temperature inducing the degradation of the oil sticking on its surface. As mentioned previously, any stock change will be long and incur cost consequence due to the oil/oil cross contamination. Finally, the design of the deodorizer described in U.S. Pat. No. 9,114,329 B2 is problematic for maintenance due to accessibility constraints and can prove difficult to implement in seismic or windy regions due to the high height of such tall single vessel.

Furthermore, a deodorizer equipped with a packed stripper, even if used with the greatest of care, must be regularly stopped for cleaning the packed stripper. Indeed, the metallic surface of a packed stripper, being in close contact with oil, is irremediably progressively fouled with oil degradation residues, mainly polymerized oil. To satisfy the highest organoleptic oil properties, is it therefore compulsory to clean the surface of the packed stripper on a regular basis. This can be done, for example, by circulating fatty acids distillate (FAD) instead of oil. However, the packed stripper must be considerably cooled (for example, at about 100° C.) due to the lower condensation temperature of the FAD. Consequently, when the packed stripper is installed inside the main vessel, such as described in U.S. Pat. No. 9,114,329 B2, the deodorizer must simply be stopped because it would be impossible to maintain the packed column at 100° C. while still maintaining the remaining parts of the deodorizer at working temperatures i.e. around 250° C. This regular mandatory maintenance also requires good accessibility for visual inspection and/or manual tasks performed by operators inside the deodorizer, especially in critical places, such as, but not limited to, around the stripper and the scrubber. This accessibility may be compromised when the stripper and the scrubber are installed in the main, and unique, vessel such as described in U.S. Pat. No. 9,114,329 B2.

Therefore, what is needed in the art is a versatile semi-continuous deodorizer equipped with a packed stripper for the economical physical refining of oil containing substantial amounts of FFA, while minimizing oil/oil cross-contamination on the stock changes occurrences. Such versatile semi-continuous deodorizer must contain a packed stripper that can readily be put in use when processing an oil containing a substantial amount of FFA. However, since inherently, a packing induces cross-contamination during feedstock change, said packing should be by-passed when the semi-continuous deodorizer must treat stocks of low FFA oil. A versatile semi-continuous deodorizer must also prevent the oil degradation taking place on the packed stripper when being by-passed. Furthermore, when used again, the packed stripper should ideally be readily usable without long fine tuning of any sort and with minimal or ideally no oil/oil cross-contamination. There is also a need for a deodorizer having an improved accessibility for straightforward maintenance operations and that can be installed in seismic and windy region. There is also a need for a deodorizer design allowing for the cleaning of the packed stripper at low temperatures with FAD while allowing/keeping the deodorizing trays at high working temperatures. Despite their merits, all those requirements are not currently met by the prior art.

SUMMARY OF THE INVENTION

It has surprisingly been observed that the above objectives can be met by a semi-continuous deodorizer as described herein. In one aspect of the present technology, the semi-continuous deodorizer comprises a first main vessel and a second vessel connected to the first main vessel by a duct for the transport of gases and vapors, the second vessel being connected to a vacuum system, both the first main vessel and the second vessel being preferably made of stainless steel and built hermetically, the first main vessel containing a top buffer tray, at least one set of thermosiphon trays, a final heating tray, at least one deodorizing tray with its supply of stripping steam, a bottom buffer tray, a first line including RB oil pump to feed the top buffer tray with RB oil and a second line including RBD oil pump to conduct the RBD oil from the bottom buffer tray to a RBD storage tank, the second vessel containing at least one scrubber, a FAD collector tray below the at least one scrubber, a third line transporting the collected FAD to a FAD storage tank, a fourth line including a FAD pump and a cooler to transport at least a fraction of the collected FAD from the FAD storage tank to a sprayer on top of the scrubber, a packed stripper and stripping steam supply below the packed stripper, a collector buffer tray below the packed stripper for the holding of the stripped oil, a fifth line to connect the final heating tray of the first main vessel to the bottom of the second vessel, a sixth line including PS pump connecting the bottom of the second vessel to the sprayer above the packed stripper, a seventh line connecting the collector buffer tray below the packed stripper to the bottom of the second vessel and an eighth line connecting the collector buffer tray below the packed stripper to the first deodorizing tray of the first main vessel, characterized in that the fifth, seventh and eighth lines contain a valve, and the fourth and sixth lines contain a three-way valve, the three-way valve of line four being able to connect line four to the bottom of the second vessel via a ninth line and the three-way valve on the sixth line being able to connect sixth line to the FAD storage tank via a tenth line.

Preferably, in some embodiments, the scrubber of the second vessel of the semi-continuous deodorizer is a packed scrubber.

In other embodiments, in the second vessel, an additional scrubber and an additional collecting tray below the additional scrubber is provided, the additional scrubber being located between the already existing scrubber and the packed stripper. In some embodiments, the additional scrubber is a packed scrubber. In some embodiments, the additional collecting tray below the additional scrubber is connected to a low-pressure steam producing boiler. In some embodiments, the additional scrubber is a shell and tube condenser.

In some embodiments, the collecting tray below the packed scrubber of the second vessel is provided with a cooling means. In some embodiments, this cooling means is a heat exchanger. In some embodiments, this heat exchanger is connected to the first line.

In another aspect of the disclosed technology, the semi-continuous deodorizer is provided with a top buffer tray, and/or at least one set of thermosiphon trays, and/or a final heating tray, and/or a bottom buffer tray, and/or the bottom of the second vessel equipped with steam supply means.

In another aspect of the disclosed technology, the bottom of the second vessel is separated in a first radial compartment for collecting the oil coming from the final heating tray, and in a second central compartment for collecting the stripped oil coming from the packed stripper.

In another aspect of the disclosed technology, an additional buffer tray is placed in the second vessel below the packed stripper.

In another aspect of the disclosed technology, the main vessel contains at least one additional tray equipped with a heat-exchanger.

In another aspect of the disclosed technology, wherein at least one set of thermosiphon trays and/or final heating tray is equipped with pigtail coil type heat exchangers, preferably a double pigtail coil (i.e. a coil of smaller diameter is enchased inside a coil of larger diameter). In some embodiments, the heat exchanger is a triple pigtail coil (i.e. a third coil of even smaller diameter is enchased inside the second coil). In some embodiments, the tube forming the third coil has a smaller diameter than the tube forming the larger coils.

In another aspect of the disclosed technology, the semi-continuous deodorizer described herein includes man-holes disposed regularly on both the first main vessel and the second vessel to ensure good access to every compartment.

DEFINITIONS

RB oil: In the context of the present technology, RB oil refers to any vegetable, animal oil or fat, or blend thereof that has been at least degummed and bleached. In the trade, such oil is known as "Refined and Bleached oil" or "RB oil." In the context of the present technology, RB oil includes oils that have undergone other modifications such as, but not limited to, fractionation and/or interesterification, and/or hydrogenation, and/or additional purification process, such as, but not limited to, dewaxing (winterization) and/or chemical refining.

RBD oil: In the context of the present technology, RBD oil refers to an RB oil (as defined above) that has been deodorized and contains a low amount of free fatty acid, typically lower that 0.1%, preferably lower than 0.05%. An RBD oil is an edible oil meeting all trade and food authorities' regulations.

Oil: In the context of the present technology, "oil", may refer to RB oil, RDB oil, as defined above, or to the product corresponding to any stage of the deodorization process, for example, but not limited to, a product that is already stripped of its FFA but that is still not completely deodorized.

Low FFA oil: In the context of the present technology, "low FFA oil" refers to an oil containing less than 1.0% of FFA such as, but not limited to, crude soybean oil, chemically refined oil, or oil that has been already physically refined at least one time.

Medium FFA oil: In the context of the present technology, "medium FFA oil" refers to an oil containing 1.0 to 2.0% FFA such as, but not limited to, crude rapeseed oil.

High FFA oil: In the context of the present technology, "high FFA oil" refers to an oil containing more than 2.0% FFA such as, but not limited to, crude palm oil or crude sunflower oil.

FFA. In the context of the present technology, FFA, refers to "free fatty acids." FFA originates from the hydrolysis of the oil and, in most cases, must be removed in order to meet strict trade specifications. Notable exceptions are olive oil and cocoa butter, often containing around 2% of FFA. For nearly all other oils, removing FFA is required in order to guarantee taste and control the smoke point.

FAD. In the context of the present technology, FAD, refers to "Fatty Acid Distillate" and corresponds to the condensate of the volatiles stripped from the RB oil during deodorization and/or physical refining. FAD contains FFA and tocopherol, but also traces of mono-glycerides and di-glycerides. FAD may also contain some contaminants present in the RB oil, such as pesticides or their degradation products. For example, FAD is typically valorized in the oleo-chemistry to produce soap or biodiesel. Its value is usually a fraction of the value of the RDB oil. However, if the FAD is very rich in tocopherol, its value can increase significantly. However, it is to be noted that FAD can also contain significant amounts of oil.

RB pump. In the context of the present technology, "RB pump" refers to the pump that pumps the RB oil from its storage tank and feeds it to the top of the main deodorizer vessel. During standard operating conditions, the output of the RB pump is constant when a given stock of RB oil is processed. During stock changes, the RB pump can be paused or on hold for several minutes to make sure the top buffer tray drains completely.

RBD pump. In the context of the present technology, "RBD pump" refers to the pump that pumps the RBD oil from the bottom buffer tray of the main deodorizer vessel to the RBD storage tank. The output of this pump is constant when a given stock of RB oil is processed and will be similar to the output of the RB pump. However, when processing oils containing large amount of FFA such as, for example, 5% FFA, the output of the RBD pump will be reduced by about 5% as compared to the output of the RB pump. During stock change, the RBD pump has to completely empty the last trayful of the old feedstock and then stop.

FAD pump. In the context of the present technology, "FAD pump" refers to the pump that pumps the FAD from its storage tank to the distributor above the packed scrubber. When processing a given stock, its output is constant. A FAD pump must be designed to resist to relatively warm FAD, and thus, hot FFA having a temperature in the range of about 25° C. to 100° C. Even if the amount of FAD produced can only represent about 0.3% of the oil feed rate (for example, for chemically refined oil) to over 5% in the case of palm oil, the recirculation rate of the FAD over the packing can be greater than the oil feed rate. In consequence, the sizing of the FAD pump must be calculated accordingly.

PS pump. In the context of the present technology, "PS pump" (i.e. Packed Stripper pump) refers to the pump that pumps the liquid from the bottom of the second vessel of the deodorizer to the distributor above the packed stripper designed to strip the FFA. When the deodorizer is processing a given stock of RB oil having medium to high concentration of FFA, the packed stripper will be used and therefore the bottom of the second vessel will contain hot RB oil that will be pumped by the PS pump to feed the distributor above the packed stripper. In those circumstances, the output of the PS pump is constant and similar to the output of the RBD pump. When the deodorizer is processing a stock of RB oil having a low concentration of FFA, the packed stripper is preferably by-passed. In some embodiments, FAD is transferred into the previously emptied bottom of the second vessel and this FAD is pumped by PS pump to the distributor of the packed stripper to cool it and wash the oil sticking on its surface. In other embodiments, the PS pump is stopped when the packed stripper is sufficiently cooled and washed.

Upon stock change, in some embodiments involving an oil containing medium to high FFA amounts and justifying the use of the packed stripper for the removal of the FFA, the bottom of the second vessel is drained from the FAD and filled with the hot RBD oil corresponding to the new stock. At this point, the PS pump output is progressively raised from its previous output to the output of the RBD pump. In some embodiments, a PS pump must be designed to resist hot oil having a maximal temperature typically in the range of 230° C. to 270° C., and also to resist to FFA having a temperature of about 100° C. to 150° C.

Packed stripper: In the context of the present technology, a packed stripper is made of metallic structured or random material of great specific surface area. Since the packed stripper is designed to strip the FFA of the RB oil it must be designed accordingly. For example, in some embodiments, a semi-continuous deodorizer planned to process 400 tons of RB oil per day will be equipped with a packed scrubber of 1.5 to 2.5 meters of diameter for a height of 2 to 4 meters. Typically, the specific surface area of the metallic structured material is comprised in the range of 150 to 250 m²/m². Therefore, the total surface area of the packed scrubber, in some embodiments, will be comprised in the range of 500 to 5000 m². It has been measured that such packed scrubber will retain about 50 to 500 kg of oil after drainage (depending on the oil and steel quality, design etc.).

Packed Scrubber: In the context of the present technology, a packed scrubber is made of, for example, but not limited to, a metallic structured material of great specific surface. Since the packed scrubber is designed to condense the FFA, its volume must be calculated accordingly and is smaller than the packed stripper. In some embodiments, the packed scrubber is about 2 to 4 times smaller than the packed stripper.

Three-way valve: In the context of the present technology, a three-way valve can be a single valve connected to three lines and able to conduct a fluid coming from one of the lines into two different lines or to stop the progression of the fluid, depending on the position of the three-way valve. Additionally, in some embodiments, the term three-way valve also includes the combination of two or more standard valves having the same functionality as a three-way valve. For example, in some embodiments, two two-way valves can be arranged in parallel and exhibit the functionality as a three-way valve.

DETAILED DESCRIPTION OF THE INVENTION

The disclosed technology will be described with the help of reference to FIGS. 1-4. However, it should be understood that such figures are illustrative and only the claims will limit the invention.

Figure 1:
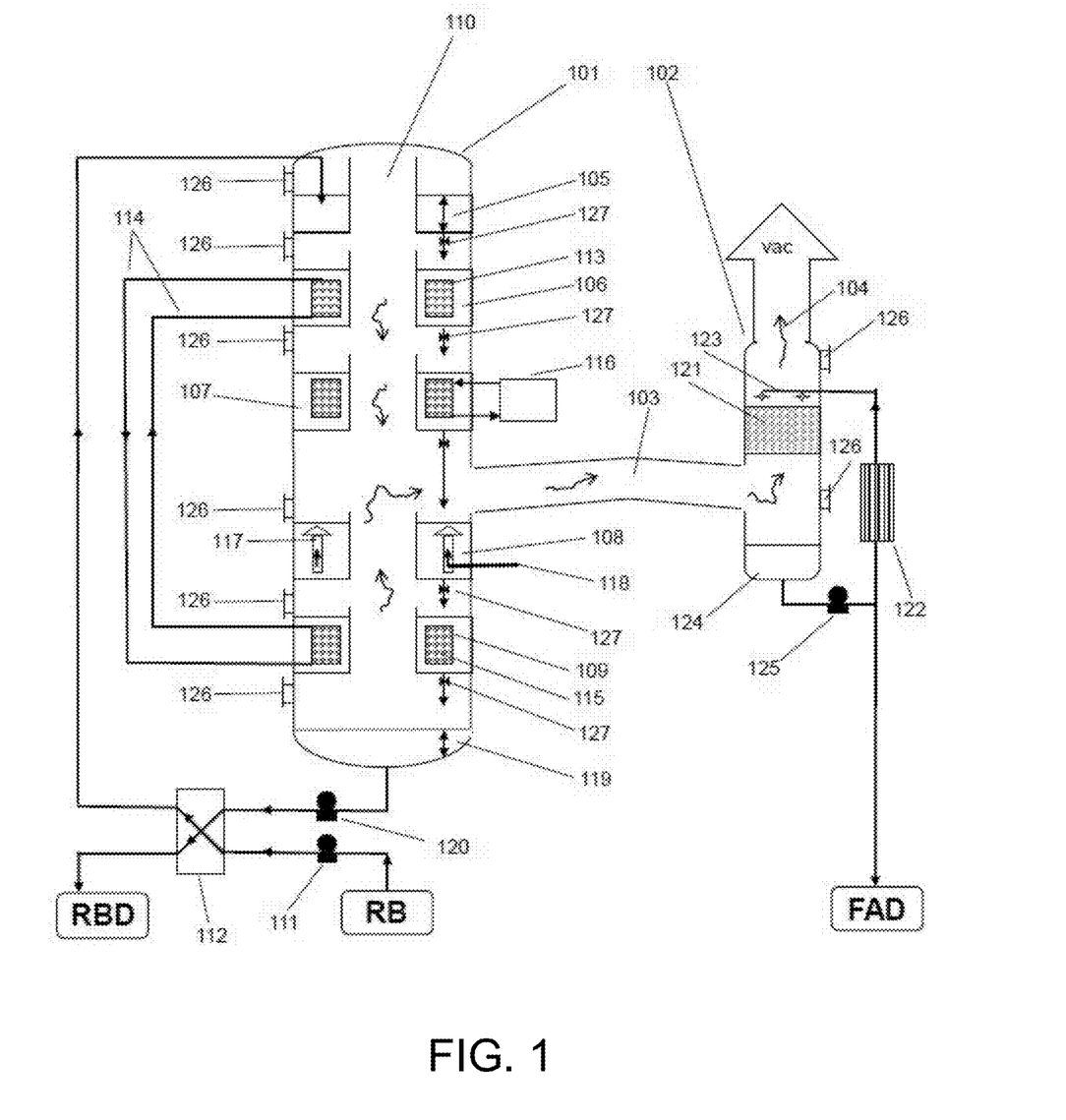
FIG. 1 is a schematic view, for reference, of a traditional multi-stock semi-continuous deodorizer with external vapor scrubber as generally known in the art.

As shown in FIG. 1, a semi-continuous deodorizer as generally available in the field is schematically represented. Such apparatus is preferably made in stainless steel and is provided in a hermetic main large vessel (101) connected to a second smaller hermetic vessel (102) via a large duct (103), the second smaller vessel (102) being connected (104) to the vacuum system (not shown). The main vessel contains all the means to conduct the oil deodorization per se and consists of several trays (105 to 109) stacked vertically around a central chimney (110). Generally, the trays are circular and stretch all around the central chimney. The top tray (105) is a buffer tray where degummed and bleached oil (RB oil) is pumped by RB pump (111) through heat-exchanger (112). Tray (106) is a heat recovery tray equipped with a heat-exchangers (113) such as pigtail coils, preferably double pigtail coils or triple pigtail coils for enhanced heat surface exchange.

These pigtail coils (113) are connected in a closed loop (114) configuration to another set of pigtail coils (115) located in the bottom tray (109) holding the hot deodorized oil. Inside the coils, water is circulated (or optionally thermal oil is circulated) and thus thermal exchange will take place between the hot deodorized oil (RBD oil) about to leave the deodorizer and the incoming still relatively cold RB oil. This system is generally known in the field as thermosiphon. Several heat recovery tray couples similar to (106 and 109) can equip the deodorizer for additional heat recovery. Tray 107 is equipped with another set of coils connected to a high-pressure boiler (116) for the final heating of the oil to the desired temperature, usually in the range of about 210° C. to about 270° C.

Deodorization tray (108) is typically equipped with a gas-lift pump or "Mammoth" pump(s) (117) and stripping steam supplies (118). When stripping steam flow through the gas-lift pump, a venturi effect will result which has the advantage of mixing vigorously the oil and favoring its contact, hence deodorization with the stripping steam. As shown in FIG. 1, only one deodorization tray (108) is represented to not obscure the drawing, but typically several deodorizing trays can equip a semi-continuous deodorizer.

In FIG. 1, stripping steam supply is only shown on the deodorizing tray (108), but it should be understood that other trays could benefit of stripping steam supply to gas-lift pump or circular steam distributor (known as "crown" in the field) in order to agitate and/or deodorize partially the oil. The bottom (119) of the main vessel is the deodorized oil (RBD) buffer collecting tray. RBD oil is pumped by RBD pump (120), flows through heat-exchanger (112) and can be safely stored at moderate temperature. Deodorizers main vessel normally also include a water-cooling tray (not shown in figures). Heat is sometimes recovered as hot water.

The second small vessel is equipped with all the means to condense the volatiles originating from the main large vessel and contains, for example, a packed scrubber (121) where the actual condensation of the volatiles (mainly FFA and some tocopherol/sterol) coming from the oil takes place. In the field, such condensate is generally called FAD (or fatty acid distillate). The second vessel is connected to a cooler (122) to cool the FAD which is sprayed on top of the packed scrubber (121) via sprayer (123). Accordingly, on contact of this cool FAD, the volatiles will condense and drop to the bottom (124) of the second vessel under the form of hot FAD. This hot FAD is circulated by FAD pump (125). One fraction of this hot FAD is stored, the remaining being cooled and sprayed on top of the structured metallic packing to condense the volatiles. Older equipment is not equipped with packed scrubbers, but the volatiles are simply condensed by contact of the cooled FAD which is sprayed via a sprayer alike sprayer (123) or condensed on a direct contact condenser.

Therefore, the apparatus as generally depicted in FIG. 1 can be operated semi-continuously. The RB oil can be pumped essentially continuously by RB pump (111) to buffer tray (105), and the RB oil can also be pumped essentially continuously from the buffer collecting tray (119) by RBD pump (120) to storage. When the level of the RB oil stored in top buffer tray (105) reaches a set level, the oil in trays (109) to (105) will successively and rapidly drop in the inferior tray via two ways drop valves (127). Therefore, the oil will be held during the same time in each tray and will be treated homogeneously as a batch.

With reference to FIG. 1, the deodorizer is advantageous to rapidly operate stock changes because the oil drops from one tray to another, not continuously, but discontinuously, with the exception of the buffer trays which may be filed/emptied continuously. Upon stock changes, the new stock can be loaded in the just previously drained top buffer tray (5) when the deodorization of the previous stock is still going on in the other inferior trays. Therefore, only limited time is lost, and minimal oil cross-contamination will occur. However, this design is not efficient when processing oil containing medium to high concentration of FFA because the stripping of the FFA in deodorizing tray is slow and thus retention time must be very long and large consumption of stripping steam will be needed. Unfortunately, as suggested by U.S. Pat. No. 9,114,329 B2, including a packed stripper (and additional buffer trays) in the main large vessel between the final heating tray (107) and the first deodorizing tray (108) for the rapid stripping of the FFA decreases drastically the versatility of a semi-continuous deodorizer as depicted in FIG. 1 because by definition, such packed stripper has a large surface area and since oil has great affinity to metal, any stock change will induce significant cross-contamination because the new batch must slowly replace the old one. Those long stock changes are particularly unwelcome when switching from one low FFA oil stock to another low FFA oil stock since in those cases a packing is redundant and not needed. Indeed, for low FFA oil, sufficiently complete FFA removal can take place during the usual and mandatory deodorization period.

It would be therefore advantageous to be able to by-pass the packed stripper when processing several batches of low FFA oils and/or to be able to rapidly clean the packed stripper when processing successive stocks of oils containing substantial FFA amounts. It has surprisingly been found that such versatility can be attained with a semi-continuous deodorizer apparatus as depicted in FIG. 2.

Figure 2:
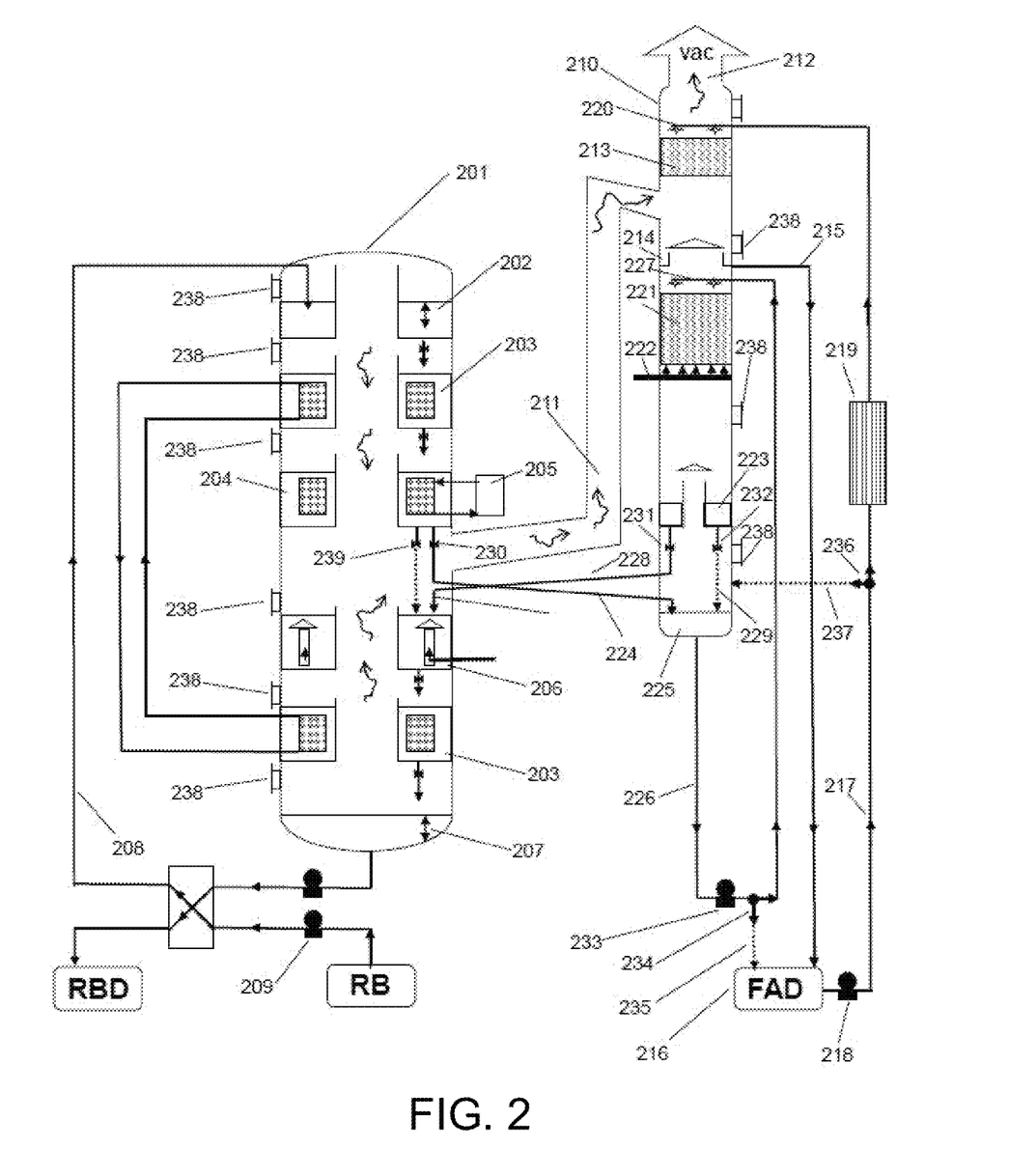
FIG. 2 is a schematic view of one of the several embodiments of the apparatus according to the present technology.

FIG. 2 provides for a semi-continuous deodorizer according to the presently disclosed technology. In such embodiments, the apparatus includes an external scrubber combined with a packed stripper for the stripping of FFA. In such embodiments, the packed stripper for the stripping of FFA can be easily by-passed when processing low FFA oil. In some embodiments, the semi-continuous deodorizer comprises a main vessel (201) containing the top buffer tray (202), at least one set of thermosiphon trays (203), the final heating tray (204) and its boiler (205), at least one deodorizing tray (206) with its supply of stripping steam, the bottom buffer tray (207) and line (208) including RB oil pump (209) to feed the top buffer tray (202) with RB oil.

In some embodiments, the apparatus further includes a second vessel (210) connected to the first vessel by a large duct (211) for the transport of gases and vapors. The second vessel is connected (212) to a vacuum system (not shown in figures). In some embodiments, both the main vessel and the second vessel are preferably made of stainless steel and are built hermetically.

In some embodiments, the second vessel comprises at least one scrubber, for example, but not limited to, a packed scrubber (213) for the scrubbing of the volatiles, a FAD collector tray (214) for the collection of the condensed volatiles (FAD), a line (215) transporting the collected FAD to the FAD storage tank (216), a line (217) including FAD pump (218) and a cooler (219), and transporting a fraction of the collected FAD to the sprayer (220) on top of packed scrubber (213).

In some embodiments, the second small vessel furthermore contains a packed stripper (221) and stripping steam supply means (222) below the packed stripper for the stripping of the FFA, and a collector buffer tray (223) below the packed stripper (221) for the holding of the stripped oil.

Generally, the large duct (211) is connected to the second vessel (210) just below the scrubber (213). Connecting the large duct (211) below the stripper (221) is also possible, but it would increase the pressure drop when the packed stripper is not used because the volatiles would be forced to pass through the packed stripper.

In some embodiments, the semi-continuous deodorizer according to the present technology further contains a line (224) transporting the oil from the final heating tray (204) to the bottom (225) of the second vessel, a line (226) transporting the oil from the bottom (225) of the second vessel to sprayer (227) above the packed stripper (221), a line (228) transporting the oil from the collector tray (223) to the first deodorizing tray (206), and a line (229) for transporting any fluid stored in the collector tray (223) to the bottom (225) of the second vessel. In some embodiments, line (224), line (228) and line (229) further contain, respectively, valve (230), valve (231), and valve (232). In some embodiments, line (226) further contains a PS pump (233) (Packed Stripper pump) and a three-way valve (234) that is able to diverge any liquid stored in the bottom (225) of the second vessel to the FAD storage tank via line (235). In some embodiments, line (217) further contains a three-way valve (236) that is able to diverge the FAD stored in FAD tank (216) to the bottom (225) of the second vessel via line (237).

In some embodiments, for inspection, cleaning and maintenance, several man-holes (238) are disposed regularly on both vessels. In order to process edible oil, easy access for inspection, cleaning and maintenance is required for such semi-continuous deodorizer. To this respect, the present technology does not jeopardize such accessibility which remains similar to the one provided by a standard equipment (see man-holes 126 on FIG. 1).

In some embodiments, when the packed stripper is used to strip the FFA contained in the RB oil, the valve (239) remains closed, and when the oil stored in final heating tray has reached its target temperature (for example, after a holding time of 15 minutes), valve (230) will open and the oil will rapidly flow by gravity from the final heating tray (204) to the bottom (225) of the second vessel. In some embodiments, the oil will rapidly flow for approximately two (2) minutes. As soon as there is a set minimal oil level in the bottom (225) of the second vessel, the three-way valve (234) is positioned to transport the oil to the sprayer (227) via line (226) and PS pump (233). Therefore, in some embodiments, oil will trickle down the packed stripper and will be contacted with the rising stripping steam introduced by any suitable steam diffusor (222), where the stripped oil will drop and be collected by a collector (223). During this phase, in some embodiments, both valve (231) and valve (232) are closed and three-way valve (236) is positioned to conduct the FAD to FAD sprayer (220) so that volatiles are condensed in scrubber packing (213). When nearly the totality of the oil contained in the bottom of the second vessel has been stripped and accumulated into collector (223), the valve (231) is opened so that the stripped oil can be discharged into deodorizing tray (206) that has been drained previously. Simultaneously, valve (230) is opened again and a new load of heated oil is transferred in the bottom of the second vessel and the same cycle is repeated until a given stock of RB oil is completely processed. Alternatively, in some embodiments, valves 230 and 231 do not have to act simultaneously but can operate one after the other.

In some embodiments, the apparatus according to the present technology can be run with or without the utilization of the packed stripper. Typically, when processing oil (e.g. low FFA oil or oil containing a low concentration of FFA), the oil is not directed from the final heating tray to the bottom of the second vessel but will be directly discharged into the first deodorizing tray because sufficient FFA stripping will occur during the deodorization. Therefore, in some embodiments, when processing various stock of low FFA oils, stock changes can be fast with marginal cross contamination between the stocks because each tray is discharged sequentially and entirely. Consequently, in this situation (i.e. when processing various stock of low FFA oils), the packed stripper is by-passed and furthermore can be reduced in temperature since hot oil is not trickling down on it. In some embodiments, its temperature will approach the temperature of the above scrubber which is usually in the range of about 50° C. (i.e. about 150° C. to 200° C. lower than typical stripping temperature). Accordingly, oil degradation is greatly reduced.

Even more advantageous, in some embodiments the cleaning of the packed stripper with cooled FAD is possible while maintaining the main vessel in operation and functional. To perform such cleaning, a three-way valve (236) is positioned to direct the FAD via line (237) to flow to the bottom (225) of the second vessel, the later one being previously emptied. In some embodiments, the FAD is directed via line (226) and PS pump (233) to the sprayer (227). Consequently, in some embodiments, the FAD will continuously clean the packed stripper so that no oil degradation can take place. This cleaning with FAD is highly advantageous for quick stock changes in case acid oils need to be processed. In such embodiments, the bottom of the second vessel is emptied by acting of three-way valve (234) to direct the FAD contained in the bottom (225) of the second vessel to the FAD tank (216).

At this point, the oil contained in the final heating tray (204) is directed via line (230) to the bottom of the second vessel and pumped via line (226) and PS pump (233) to sprayer (227). This hot oil will heat the packed stripper and consequently the FAD will evaporate and be condensed in the scrubber (213). Therefore, no cross-contamination takes places. In some embodiments, during such stock changes, more stripping steam can be used to cope with the temporarily higher concentration of FFA and/or the outputs of PS pump (233) and RB pump (209) can be reduced to avoid an overload on the scrubber. Now turning to FIG. 3, another embodiment of a semi-continuous deodorizer is provided. In some embodiments, the semi-continuous deodorizer comprises an external scrubber combined with a packed stripper for the stripping of FFA. In such embodiments, the packed stripper for the stripping of FFA can be easily by-passed when processing low FFA oil. In such embodiments, the semi-continuous deodorizer comprises a means to directly cool the oil after its stripping.

Figure 3:
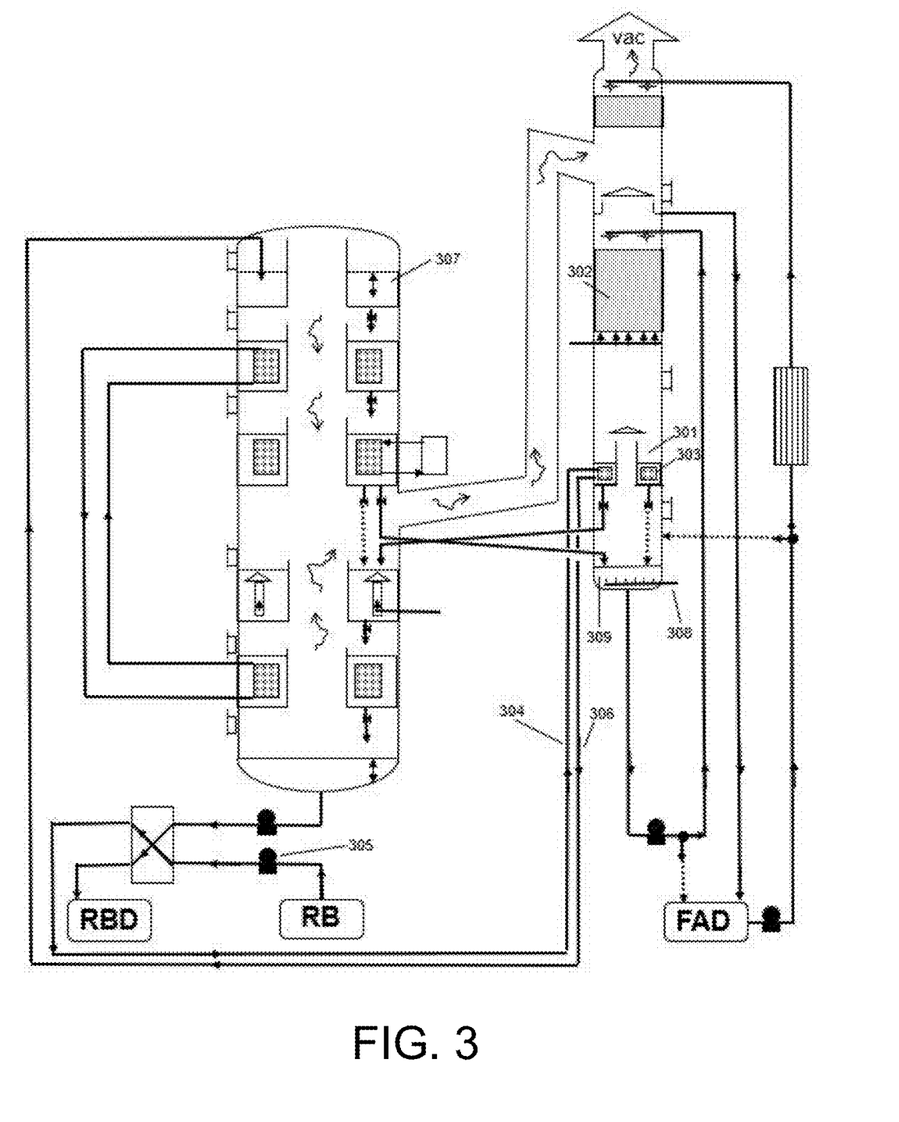
FIG. 3 is a schematic view of one of the several embodiments of the apparatus according to the present technology.

In some embodiments, the stripped oil collected in the tray below (301) the packed stripper (302) is cooled by a heat exchanger (303), for example, but not limited to, tubes of stainless steel. In some embodiments, incoming RB oil is conducted via line (304) and RB pump (305) inside the tubes of stainless steel composing the heat exchanger (303) and line (306) conducts the incoming RB oil to top buffer tray 307. In some embodiments, some stripping steam supply means 308 can be installed in the bottom of the second vessel (309). The remaining features of the apparatus is similar to the first embodiment illustrated in FIG. 2. The advantage of this embodiment is to reduce the thermal degradation of the oil.

Typically, the stripping is realized at high temperature during a short time in the packed stripper and directly after the oil temperature is reduced to perform the deodorization. Deodorization requires a period of time of typically about 30 minutes to 1 hour because the thermal decomposition of colors and or malodorous component is relatively slow. However, to avoid the formation of glycidyl ester and to some extent minimize the formation of 3-MCPD, in some embodiments, it is advantageous to reduce the deodorization temperature and slightly increase the deodorization holding time.

For example, palm oil is prone to form 3-MCPD and GE during deodorization, and at the same time, contains high concentration of FFA, typically about 5%. Therefore, in some embodiments, it is advantageous to strip rapidly the FFA with a packed stripper at a temperature of about 250° C., and to deodorize at lower temperature of about 230° C. The apparatus according to the disclosed technology as illustrated in FIG. 3, permits such dual temperature deodorization.

Figure 4:
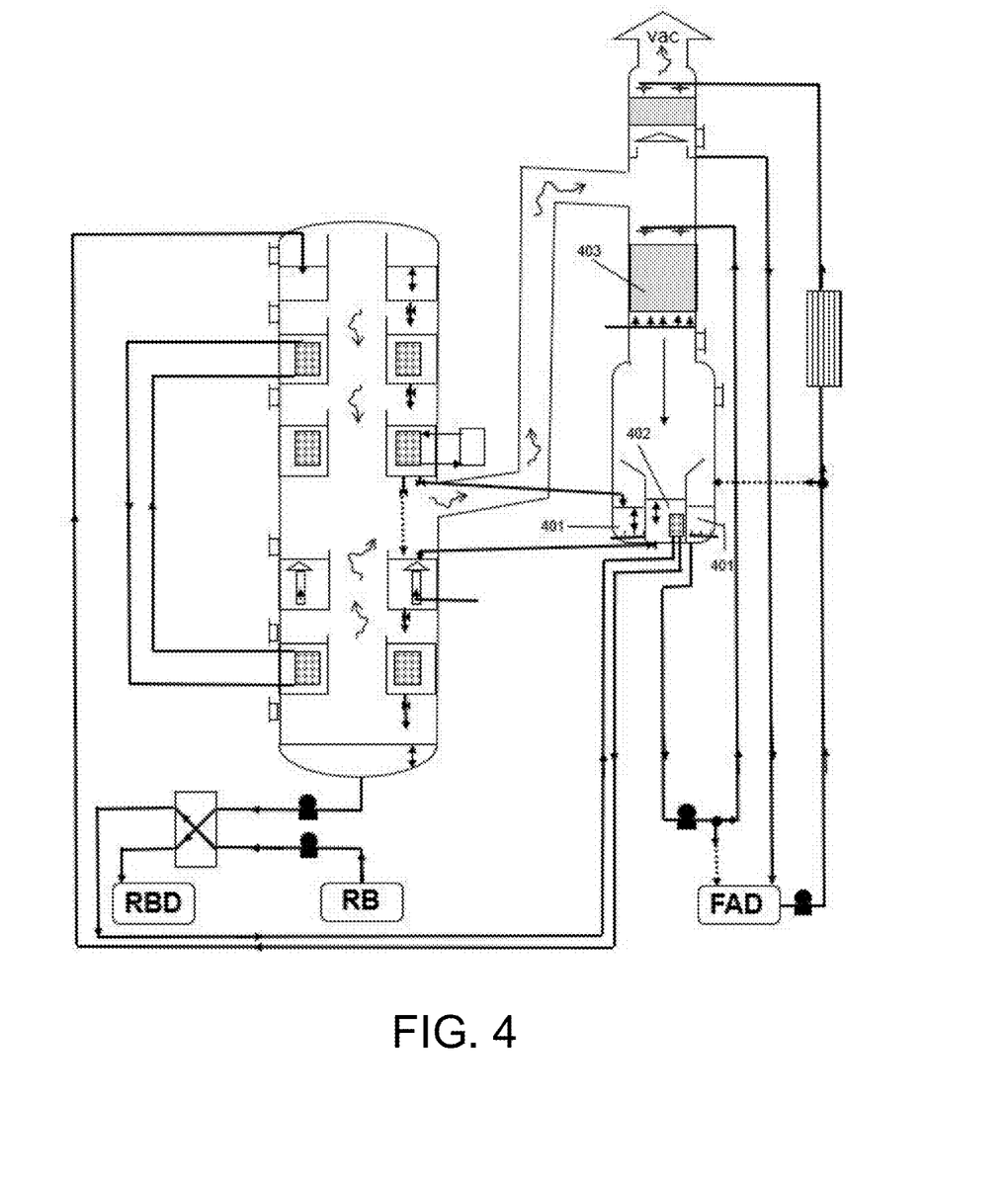
FIG. 4 is a schematic view of one of the several embodiments of the apparatus according to the present technology.

In other embodiments, for example, FIG. 4 shows an alternative embodiment where the bottom of the second vessel is separated in a first radial compartment (401) for collecting the oil coming from the final heating tray, and in a second central compartment (402) for collecting the oil coming from the packed stripper (403). Such configuration has the advantage of being more compact.

With reference to FIGS. 2 and 3, in some embodiments, the packed stripper feed buffer tank is positioned below the packed stripper receiving tank, both being positioned below the packed stripper, where the packed stripper buffer tank is positioned below the final heating tray and the packed column collecting tank is positioned above the first deodorizing tray. In such embodiments, this configuration is important as it allows for the gravity feeding of oil and the usage of simple drop valves in order to feed the various trays and tanks as needed during the operations. When the packed stripper feeding tank is situated below the packed column, a pump must be used, which seemingly adds complexity in comparison to the prior art. However, in some embodiments, as it is the case in the present technology, the necessity of a pump to feed the packed stripper in oil is surprisingly advantageous since its output is not dependent on the level of the oil loaded in the packed stripper buffer tank.

On the contrary, when the packed stripper buffer tank is situated above the packed stripper, the output of the sprayer distributing the oil above the packed stripper will be affected by the level of oil loaded in the buffer tank. This leads to variation in oil quality. Of course it would be possible to attempt to even out the rate at which oil fell from a buffer tank through a control valve, but a person of ordinary skill in the art would understand that this solution is more complex and less satisfactory than a pump, as it is the case in the present technology.

It is believed that this surprising observation is related to the sizable dimension of the buffer tank. Indeed, a buffer tank will, for example, contain 5 tons of oil when full and be emptied almost completely before receiving a new load of oil from the up-stream tray (normally the final heating tray). It means that the variation of the oil pressure on the control valve is high which makes the delivery of a constant output through the control valve difficult. Pumps output, on the contrary, are not, or only marginally affected by the oil level of the buffer tank especially when the buffer tank is located bellow the packed stripper distributor.

As shown in FIGS. 2, 3, and 4, in some embodiments, the second vessel is equipped with one scrubber. In such embodiments, the scrubber is a packed scrubber. It should be understood by a person of skill in the art that the semi-continuous apparatus according to the present technology may contain more than one scrubber, and in some embodiments, two scrubbers.

In a preferred embodiment, the semi-continuous deodorizer as depicted by FIGS. 2, 3, and/or 4, contains two scrubbers, wherein a first scrubber is working at a high temperature (about 150° C. to 200° C.) for preferential condensation of tocopherol and producing a tocopherol rich FAD, and a second scrubber is working at lower temperature (about 30 to 60° C.) for the preferential condensation of FFA and producing a FFA rich FAD.

In yet another preferred embodiment, the cooling of the tocopherol rich FAD may produce low pressure steam. This can be realized in, for example, but not limited to, a tubular heat-exchanger where the tocopherol rich FAD circulates inside the tube and communicate its heat to pressurized water outside the tubes. In such embodiments, the low-pressure steam produced by this above described heat recovery mechanism can be used as stripping steam anywhere in the apparatus according to the present technology. In some embodiments, the tubular condenser replaces the high temperature first scrubber and is directly fitted inside the second vessel of the semi-continuous apparatus according to the present technology.

In another embodiment, an additional buffer tray can be placed in the second vessel just below the packed stripper. Such additional buffer tray will keep the oil level constant in trays equipped with heat-exchanger, such as the item 303 of FIG. 3, and therefore, the heat exchange may be optimized. However, with such configuration the oil is not directly cooled after the FFA stripping and therefore more thermal degradation of the oil could occur.

In some embodiments, the main vessel comprises at least one additional tray equipped with heat-exchanger, which allows dual deodorization temperature even in the case the packed stripper is not used. For example, such additional buffer tray may be inserted between two deodorizing trays.

Efficient thermal exchange is crucial for the apparatus and process according to the present technology. In some embodiments, heat exchangers are preferably of the pigtail coil type, and in other embodiments, preferably double pigtail coil (meaning that a coil of smaller diameter is enchased inside a coil of larger diameter). In other embodiments, the heat exchanger is a triple pigtail coil (meaning that a third coil of even smaller diameter is enchased inside the second coil). In some embodiments, the tube forming the third coil has a smaller diameter than the tube forming the larger coils.

In some embodiments, the advantages of a triple coil, beside extra surface area exchange, and hence improved heat exchange, is that when stripping steam is injected in the middle of the coil, some gas lifting effect has been surprisingly observed. Good mixing, good thermal exchange and substantial deodorization can take place in the final heating tray and to some extent in the thermosiphon trays. Therefore, the total heat stress of the oil processed by the apparatus and/or process according to the present technology can be further reduced because substantial deodorization takes place simultaneously to the thermal exchange process.

While embodiments of the disclosed technology have been described, it should be understood that the present disclosure is not so limited, and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A semi-continuous deodorizer, comprising
   a first main vessel; and
   a second vessel, wherein the second vessel is connected to the first main vessel by a duct for the transport of gases and vapors, the second vessel being connected to a vacuum system, wherein both the first main vessel and the second vessel being made of stainless steel and built hermetically,
   said first main vessel containing a top buffer tray; at least one set of thermosiphon trays; a final heating tray; at least one deodorizing tray with its supply of stripping steam; a bottom buffer tray; a first line including refined bleached (RB) oil pump to feed the top buffer tray with RB oil and a second line including deodorized refined bleached (RBD) oil pump to conduct the RBD oil from the bottom buffer tray to a RBD storage tank,
   said second vessel containing a first scrubber; a fatty acid distillate (FAD) collector tray below the first scrubber; a third line transporting the collected FAD to a FAD storage tank; a fourth line including a FAD pump and a cooler to transport at least a fraction of the collected FAD from the FAD storage tank to a sprayer on top of the first scrubber; a packed stripper and stripping steam supply means below the packed stripper; a collector buffer tray below the packed stripper (PS) for the holding of the stripped oil; a fifth line to connect the final heating tray of the first main vessel to the bottom of the second vessel; a sixth line including PS pump connecting the bottom of the second vessel to the sprayer above the packed stripper; a seventh line connecting the collector buffer tray below the packed stripper to the bottom of the second vessel; and an eighth line connecting the collector buffer tray below the packed stripper to the first deodorizing tray of the first main vessel, wherein said fifth, seventh and eighth lines contain a valve, and said fourth and sixth lines contain a three-way valve, said fourth line is connectable to the bottom of the second vessel via a ninth line and said three-way valve, said sixth line is connectable to the FAD storage tank via a tenth line and said three-way valve.

2. The semi-continuous deodorizer according to claim 1, wherein the first scrubber is a packed scrubber.

3. The semi-continuous deodorizer according to claim 1, wherein the second vessel contains a second scrubber and an additional collecting tray below said second scrubber, said second scrubber being located between the first scrubber and the packed stripper.

4. The semi-continuous deodorizer according to claim 3, wherein said second scrubber is a packed scrubber.

5. The semi-continuous deodorizer according to claim 3, wherein said additional collecting tray below said second scrubber is connected to a low-pressure steam producing boiler.

6. The semi-continuous deodorizer according to claim 3, wherein said second scrubber is a tube and shell condenser.

7. The semi-continuous deodorizer according to claim 1, wherein said collecting tray below the packed scrubber is provided with a cooling means.

8. The semi-continuous deodorizer according to claim 7, wherein said cooling means is a heat exchanger.

9. The semi-continuous deodorizer according to claim 8, wherein said heat exchanger is connected to the first line.

10. The semi-continuous deodorizer according to claim 1, wherein the top buffer tray, or the at least one set of thermosiphon trays, or the final heating tray, or the bottom buffer tray, or the bottom of the second vessel is provided with at least one steam supply means.

11. The semi-continuous deodorizer according to claim 1, wherein the bottom of the second vessel is separated in a first radial compartment for collecting the oil coming from the final heating tray, and in a second central compartment for collecting the stripped oil coming from the packed stripper.

12. The semi-continuous deodorizer according to claim 1, wherein a third buffer tray is placed in the second vessel below the packed stripper.

13. The semi-continuous deodorizer according to claim 1, wherein the main vessel contains at least one additional tray equipped with a heat-exchanger, wherein said at least one additional tray is a heat recovery tray.

14. The semi-continuous deodorizer according to claim 1, wherein said at least one set of thermosiphon trays and/or final heating tray is equipped of pigtail coil type heat exchangers.

15. The semi-continuous deodorizer of claim 14, wherein said pigtail coil type heat exchangers have a double pigtail coil, wherein a first coil of a larger diameter encases a second coil of a smaller diameter.

16. The semi-continuous deodorizer of claim 14, wherein said pigtail coil type heat exchangers have a triple pigtail coil, wherein a first coil encases a second coil and the second coil encases a third coil, such that the diameter of the first coil is larger than the diameter of the second coil and the diameter of the second coil is larger than a diameter of the third coil.

17. The semi-continuous deodorizer according to claim 1, wherein the first main vessel and the second vessel have man-holes.

18. The semi-continuous deodorizer according to claim 1, wherein a packed stripper feed buffer tank is positioned below a packed stripper receiving tank, the packed stripper receiving tank is positioned below the packed stripper, a packed stripper buffer tank being positioned below the final heating tray, and the packed column collecting tank being positioned above the first deodorizing tray.

19. The semi-continuous deodorizer according to claim 1, wherein the top buffer tray, and the at least one set of thermosiphon trays, and the final heating tray, and the bottom buffer tray, and the bottom of the second vessel are provided with at least one steam supply means.

20. The semi-continuous deodorizer according to claim 1, wherein at least one steam supply means is provided to one or more of:
the top buffer tray,
the at least one set of thermosiphon trays,
the final heating tray,
the bottom buffer tray, and/or
the bottom of the second vessel.

* * * * *